US011203409B2

(12) United States Patent
Fenske (10) Patent No.: US 11,203,409 B2
(45) Date of Patent: Dec. 21, 2021

(54) GEOMETRIC MORPHING WING WITH ADAPTIVE CORRUGATED STRUCTURE

(71) Applicant: Charles J. Fenske, Edgartown, MA (US)

(72) Inventor: Charles J. Fenske, Edgartown, MA (US)

( * ) Notice: Subject to any disclaimer, the term of this patent is extended or adjusted under 35 U.S.C. 154(b) by 461 days.

(21) Appl. No.: 16/277,304

(22) Filed: Feb. 15, 2019

(65) Prior Publication Data

US 2019/0256189 A1    Aug. 22, 2019

Related U.S. Application Data

(60) Provisional application No. 62/631,984, filed on Feb. 19, 2018.

(51) Int. Cl.
*B64C 3/48* (2006.01)
*B64C 3/52* (2006.01)
*B64C 3/44* (2006.01)

(52) U.S. Cl.
CPC .......... *B64C 3/48* (2013.01); *B64C 3/52* (2013.01); *B64C 2003/445* (2013.01)

(58) Field of Classification Search
CPC .... B64C 3/44; B64C 3/48; B64C 3/50; B64C 3/52; B64C 2003/445; F05B 2240/31; F05B 2240/311
See application file for complete search history.

(56) References Cited

U.S. PATENT DOCUMENTS 4,084,029 A    4/1978  Johnson et al.
5,971,328 A *  10/1999 Kota ................. B63H 25/382
                                            244/219

(Continued)

FOREIGN PATENT DOCUMENTS

CN    101708772    5/2010
EP    2965985 A1    1/2016
(Continued)

OTHER PUBLICATIONS

Woods. B. K. S. and Friswell, M. I., "Preliminary Investigation of a Fishbone Active Camber Concept" (2012). ASME 2012 Conference on Smart Materials, Adaptive Structures and Intelligent Systems SMASIS2012. College of Engineering, Swansea University. http://michael.friswell.com/cpaper12ft.html (Year: 2012).*

(Continued)

*Primary Examiner* — Richard R. Green
*Assistant Examiner* — Arfan Y. Sinaki
(74) *Attorney, Agent, or Firm* — Fish & Richardson P.C.

(57) ABSTRACT

An airfoil member includes an airfoil skin, a trailing edge member, a spar member extending in a lateral direction within the airfoil skin, and an airfoil member morphing device configured to modify a shape of the airfoil skin. The device includes at least one motor or actuator, an airfoil skin support sheet attached to the spar member and corrugated to define alternating upper and lower lines of contact with inner surfaces of the rearward upper skin and rearward lower skin. Actuating bands extend from the spar member through alternating upward and downward sections of the airfoil skin support sheet and are operably connected to the at least one motor or actuator. The airfoil member morphing device is configured to independently adjust a camber, twist, and chord length of the airfoil member.

20 Claims, 9 Drawing Sheets

(56) References Cited

U.S. PATENT DOCUMENTS

| | | | |
|---|---|---|---|
| 6,276,641 B1* | 8/2001 | Gruenewald | B64C 3/48 244/213 |
| 6,491,262 B1* | 12/2002 | Kota | B64C 3/48 244/219 |
| 6,622,974 B1 | 9/2003 | Dockter et al. | |
| 6,910,661 B2 | 6/2005 | Dockter et al. | |
| 7,195,201 B2 | 3/2007 | Grether et al. | |
| 7,798,443 B2 | 9/2010 | Hamilton et al. | |
| 7,802,759 B2 | 9/2010 | Ishikawa et al. | |
| 8,366,057 B2 | 2/2013 | Vos et al. | |
| 8,418,967 B2 | 4/2013 | Hemmelgarn et al. | |
| 8,925,870 B1 | 1/2015 | Gordon et al. | |
| 9,457,887 B2 | 10/2016 | Roe et al. | |
| 2002/0100842 A1* | 8/2002 | Perez | B64C 3/48 244/219 |
| 2006/0145031 A1* | 7/2006 | Ishikawa | B64C 3/48 244/219 |
| 2006/0157623 A1* | 7/2006 | Voglsinger | B64C 3/48 244/219 |
| 2007/0152106 A9* | 7/2007 | Perez-Sanchez | B64C 3/48 244/219 |
| 2010/0224734 A1* | 9/2010 | Grip | B64C 3/48 244/219 |
| 2010/0259046 A1 | 10/2010 | Kota et al. | |
| 2011/0038727 A1 | 2/2011 | Vos et al. | |
| 2019/0202543 A1* | 7/2019 | Gatto | B64C 3/187 |

FOREIGN PATENT DOCUMENTS

| | | |
|---|---|---|
| EP | 2475874 B1 | 8/2016 |
| EP | 2179918 B1 | 5/2018 |
| JP | 5057404 | 8/2012 |
| WO | 2004/088130 | 10/2004 |
| WO | 2018/046936 | 3/2018 |

OTHER PUBLICATIONS

Navaratne, R., Dayyani, I, Woods, B. K. S., Friswell, M. I., "Development and Testing of a Corrugated Skin for a Camber Morphing Aerofoil" (2015). 23rd AIAA/AHS Adaptive Structures Conference. College of Engineering, Swansea University. https://arc.aiaa.org/doi/10.2514/6.2015-0792 (Year: 2015).*

* cited by examiner

GEOMETRIC MORPHING WING WITH ADAPTIVE CORRUGATED STRUCTURE

PRIORITY CLAIM

This application claims priority under 35 U.S.C. § 120 from U.S. Application No. 62/631,984 filed on Feb. 19, 2018. The entire contents of this priority application is incorporated herein by reference.

TECHNICAL FIELD

This invention relates to airfoils and airfoil systems having morphing shapes.

BACKGROUND

Examples of aerodynamic applications of wings or airfoils (e.g., applications involving gas flow), include aircraft wings, stabilizer fins, and rudders; rocket fins; wind turbine blades used in wind energy harvesting; automotive wings, e.g., "spoilers," and air dams; turbine blades used to convert kinetic energy of a flowing gas to mechanical energy, e.g., turbocharger impeller blades; fan or turbine blades used to convert mechanical energy to kinetic energy of a flowing gas e.g., turbocharger compressor blades. Examples of hydrodynamic applications of wings, (e.g., applications involving liquid flow), include propeller blades used to drive marine craft such as boats, ships, and submarines; turbine blades used convert kinetic energy of a flowing liquid to mechanical and electrical energy, e.g., hydropower generation.

A wing can have a cantilevered structure, such as is typically (but not always) used in aircraft flight, where a proximal end of the wing is attached to the aircraft fuselage and the wing extends outwardly to a distal free end. A wing can also be used with both ends fixed to a structure, such as in automotive applications, where opposed ends of a spoiler wing are attached to the rear of a vehicle.

There is an optimum shape of the wing for any given application; however, the conditions in which the wing operates are almost always dynamic and change with time. As such fluid flow conditions or wing "output" conditions change, the optimum shape of the wing to obtain the desired effect of the wing will also change. Aircraft that need to operate in several performance environments, must often compromise flight performance by using airfoil members that do not provide suitable characteristics in multiple environments.

SUMMARY

An airfoil member and an airfoil member altering system can modify the shape of the airfoil member (also referred to as a wing), providing the airfoil member with increased adaptability to various fluid flow conditions. The airfoil member has at least one geometric morphing device that causes the airfoil to be adjustable along three degrees of freedom.

In wind energy generation, the shape of a wind turbine wing for highest efficiency energy harvesting varies with the velocity of the incoming wind. The optimum shape also varies with the velocity of the wing in the flowing wind, and such velocity varies with the radial location along the length of the wing. Wind turbine wings are at least to some extent adjustable relative to the incoming wind in that the overall pitch of the wing can be adjusted by rotation within the wing mounting on a rotating spindle.

With regard to aviation, a typical airplane flight includes several phases. These phases, which include takeoff, climb, cruise, slow flight, descent, and landing, require different wing geometries in order to operate at peak efficiency. Traditional trailing edge wing flaps were invented to solve this problem. Most flaps can only change the camber of the wing, and a flap configuration known as a fowler flap can also change the chord length of a wing. Leading edge flaps can further modify the wing geometry. Traditional flaps are rigid structures (as opposed to compliant), and are therefore heavy and have limited versatility and range of motion. Their rigid structure also causes discontinuities along the wing surface, further decreasing performance.

A small disturbance in the aerodynamic boundary layer upstream can significantly affect the airflow downstream. Fowler flaps are particularly complicated and prone to error, but they are widely used on commercial aircraft for their ability to change the wing chord length in addition to camber. However, most fowler flaps cannot change the chord length and camber angle independently.

Morphing wings offer a solution to this problem because they have the potential to change the shape of the wing without discontinuities. Newly developed advanced materials applied to morphing wings can decrease weight and increase range of motion and versatility. Several prior morphing wing designs improve on the traditional flap design using compliant materials. Advantageously, the current disclosure can change the camber, twist, and chord length of a wing independently of each other.

Additionally, in any given wing application, the optimum shape of the wing often varies with the exact location along the wing, and can also vary rapidly with time. For example, in the flight of a large commercial aircraft, the deployment of the flaps of the wings in preparation for approach and landing can take 10 to 15 seconds. While that can be suitable for that particular application, in many wing applications, the flow conditions and/or output requirements of the wing can change much faster.

In some embodiments, an airfoil member includes an airfoil skin having a forward skin, a rearward upper skin, and a rearward lower skin, a trailing edge member, a spar member extending in a lateral direction within the airfoil skin, and an airfoil member morphing device configured to modify a shape of the airfoil skin. The device has at least one motor or actuator, an airfoil skin support sheet attached to the spar member and extending to the trailing edge member, the airfoil skin support sheet corrugated to define alternating upper and lower lines of contact with inner surfaces of the rearward upper skin and rearward lower skin, and a plurality of actuating bands extending from the spar member through alternating upward and downward sections of the airfoil skin support sheet and joined at a rearward end thereof to a rearward end of the rearward upper skin and rearward lower skin or to the trailing edge member, the plurality of actuating bands operably connected to the at least one motor or actuator, wherein the airfoil member morphing device is configured to independently adjust a camber, twist, and chord length of the airfoil member.

Embodiments can include one or more of the following features: the airfoil skin support sheet extends from the spar member in the shape of a damped sine wave. The airfoil skin support sheet extends from the spar member in the shape a damped square wave. The damped square wave has curved edges near the lines of contact with the inner surfaces of the rearward upper skin and rearward lower skin. The airfoil skin support sheet is attached to a center of the spar member. The airfoil skin support sheet is attached near a top or bottom edge of the spar member. The at least one motor or actuator is attached to the spar member. The at least one motor or actuator is attached to at least one of the plurality of actuating bands at a position between the spar member and the trailing edge member. The plurality of actuating bands comprise upper left, upper right, lower left, and lower right actuating bands. Rearward actuation of the upper left and upper right actuating bands and forward actuation of the lower left and lower right actuating bands cambers the airfoil member downwardly, and forward actuation of the upper left and upper right actuating bands and rearward actuation of the lower left and lower right actuating bands cambers the airfoil member upwardly. Rearward actuation of the upper left, upper right, lower left, and lower right actuating bands increases the chord length of the airfoil member. Rearward actuation of the upper left, upper right, lower left, and lower right actuating bands increases the chord length by at least approximately 5 degrees. Rearward actuation of the upper left and lower right actuating bands and forward actuation of the lower left and upper right actuating bands twists the airfoil member around a lateral axis in a first direction, and forward actuation of the upper left and lower right actuating bands and rearward actuation of the lower left and upper right actuating bands twists the airfoil member around the lateral axis in a second direction opposite to the first direction. The rearward upper skin and rearward lower skin are flexible in upper and lower directions orthogonal to the lateral direction and elastically deformable in upper and lower directions and forward and rearward directions orthogonal to the lateral direction. The airfoil skin support sheet is flexible in upper and lower directions orthogonal to the lateral direction. The forward skin and airfoil skin support sheet are monolithic. The airfoil skin support sheet comprises a first material, and a second material near the lines of contact with the inner surfaces of the rearward upper skin and rearward lower skin. The at least one motor or actuator is electrically coupled to a system controller. Sensors are within the airfoil skin, the sensors configured to detect a condition of the airfoil member.

In some embodiments, an airfoil system includes a wing spanning in a lateral direction from a wingtip to a wing root, a plurality of airfoil members joined sequentially along the lateral direction, each airfoil member including, an airfoil member includes an airfoil skin having a forward skin, a rearward upper skin, and a rearward lower skin, a trailing edge member, a spar member extending in a lateral direction within the airfoil skin, and an airfoil member morphing device configured to modify a shape of the airfoil skin. The device has at least one motor or actuator, an airfoil skin support sheet attached to the spar member and extending to the trailing edge member, the airfoil skin support sheet corrugated to define alternating upper and lower lines of contact with inner surfaces of the rearward upper skin and rearward lower skin, and a plurality of actuating bands extending from the spar member through alternating upward and downward sections of the airfoil skin support sheet and joined at a rearward end thereof to a rearward end of the rearward upper skin and rearward lower skin or to the trailing edge member, the plurality of actuating bands operably connected to the at least one motor or actuator, wherein the airfoil member morphing device is configured to independently adjust a camber, twist, and chord length of the airfoil member. A system controller is operatively connected to the airfoil members, and configured to send commands to the airfoil members to independently adjust a camber, twist, and chord length of least a portion of the wing.

As described herein, extension, upward and downward camber, and twist of the wing can all be varied independently of each other in the wing. Rearward actuation of the upper left and upper right actuating bands and forward actuation of the lower left and lower right actuating bands cambers the wing downwardly, and forward actuation of the upper left and upper right actuating bands and rearward actuation of the lower left and lower right actuating bands cambers the wing upwardly. Rearward actuation of the upper left, upper right, lower left, and lower right actuating bands extends the wing rearwardly. Rearward actuation of the upper left and lower right actuating bands and forward actuation of the lower left and upper right actuating bands twists the wing around a lateral axis in a first direction. Forward actuation of the upper left and lower right actuating bands and rearward actuation of the lower left and upper right actuating bands twists the wing around the lateral axis in a second direction opposed to the first direction The extension, camber, and twist capabilities are facilitated by the rearward upper and lower wing skins and the wing skin support sheet being flexible in upper and lower directions orthogonal to the lateral direction, and by being elastically deformable in upper and lower directions and forward and rearward directions orthogonal to the lateral direction.

Advantages of this disclosure include, across a range of wing applications, a wide range of shape adjustment capability with wing shape parameters independent of each other, localized shape adjustment capability, and rapid adjustment capability.

Advantageously, the wing of the present disclosure offers significant gains in efficiency and versatility in comparison to wings that include traditional rigid flaps. The wing described herein can potentially replace wings comprised of flaps and/or ailerons, while improving performance and versatility, on almost any type of aircraft.

In certain embodiments, a single corrugated wing structure can be used on an entire wing, providing a seamless transition between flaps and ailerons. Additionally, the wing of the present disclosure is applicable to automotive spoilers, wind turbines, helicopter blades, rocket fins, underwater vehicles, fluid transport devices such as fans, propellers, and pump impellers, and any other application that uses aerodynamic or hydrodynamic control surfaces.

In this description, the term "morphing" refers to the ability of an object or device to change, such as its size and shape. For example, the airfoil member is capable of changing its shape along various parameters. The adjustable parameters include, but are not but not limited to, span, chord, twist, and camber of the airfoil.

In this description, the term "fluid" refers to both liquids and gases.

In this description, the terms "wing," "airfoil," and "airfoil member" are used interchangeably, and should be understood to refer to a 3-dimensional object having a shape that when moved through a fluid produces an aerodynamic or hydrodynamic force.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
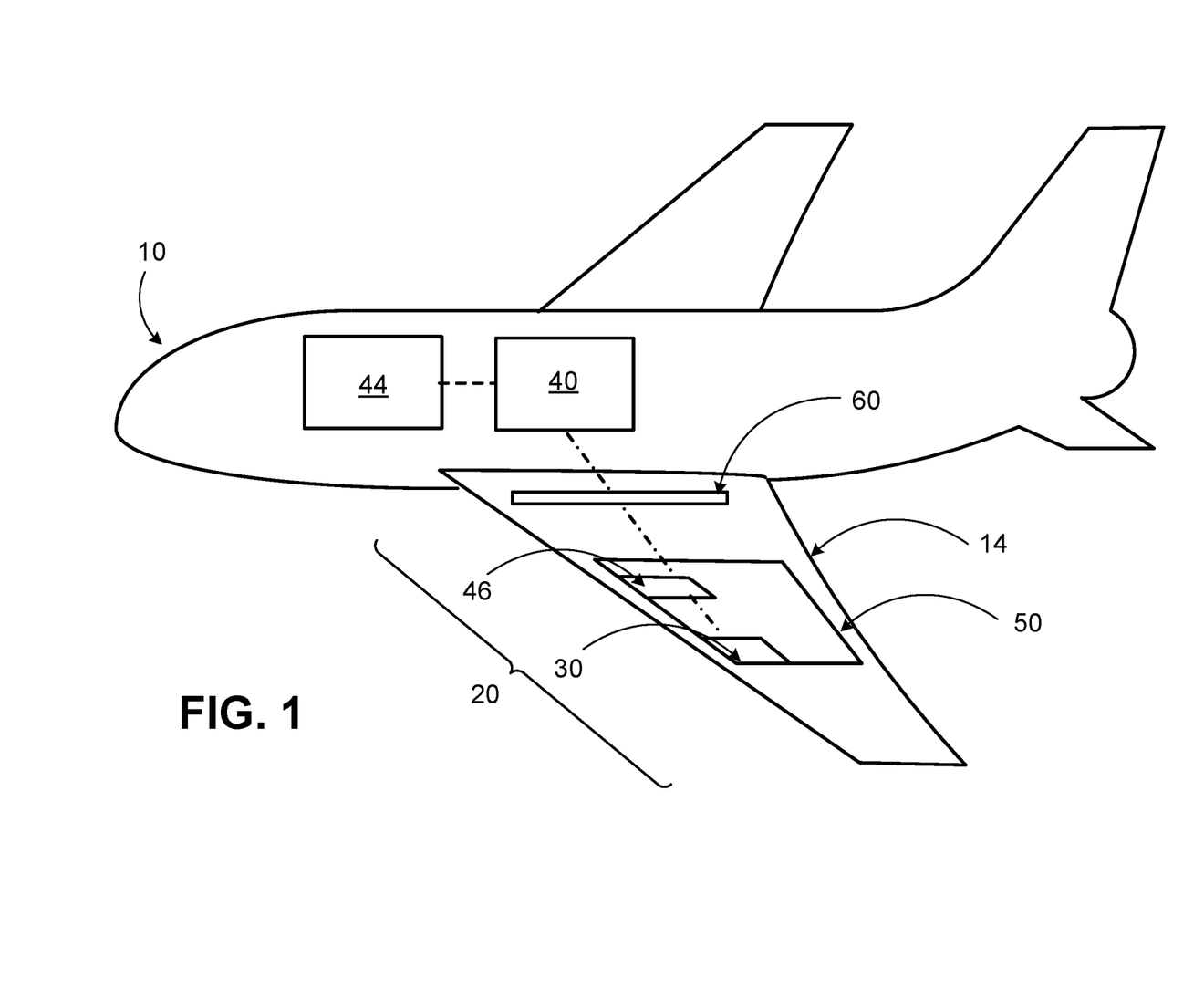
FIG. 1 is a schematic view of an exemplary aircraft using an airfoil member altering system.
Figure 2:
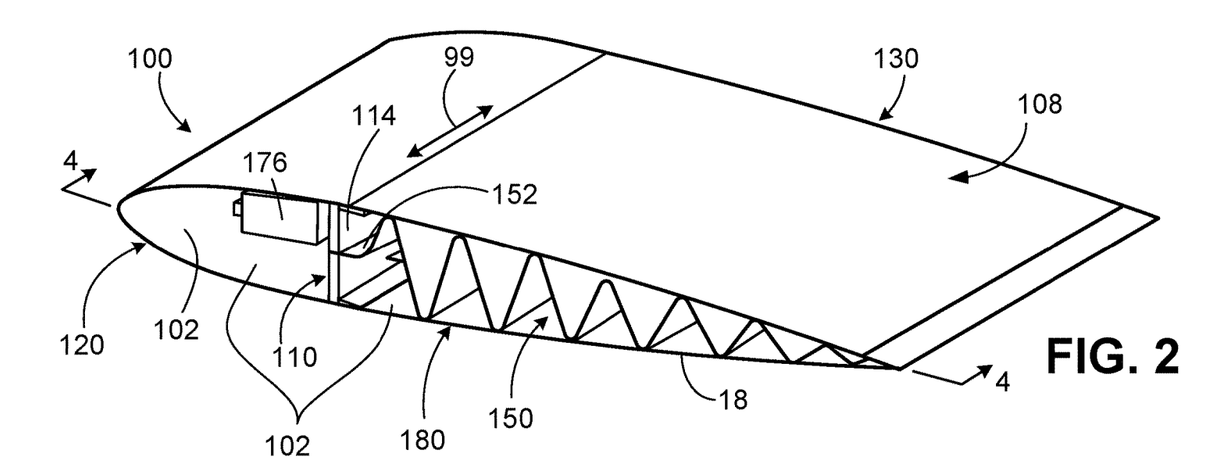
FIG. 2 is a first upper perspective cutaway view of a wing with an airfoil member altering system.
Figure 3:
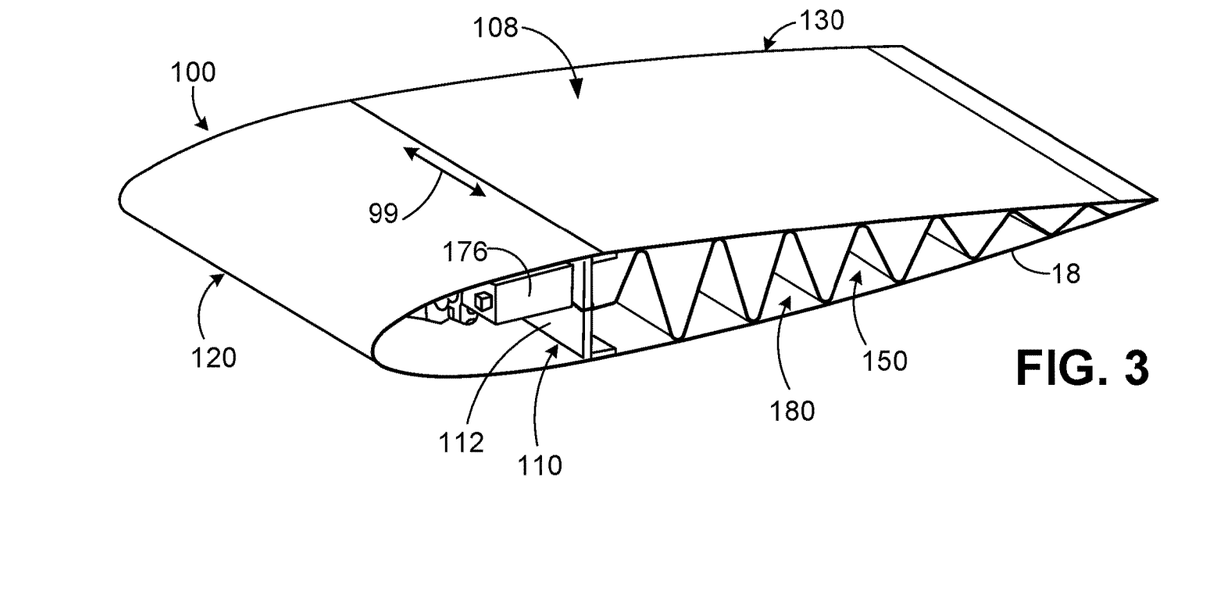
FIG. 3 is a second upper perspective cutaway view of the wing of FIG. 2.
Figure 4:
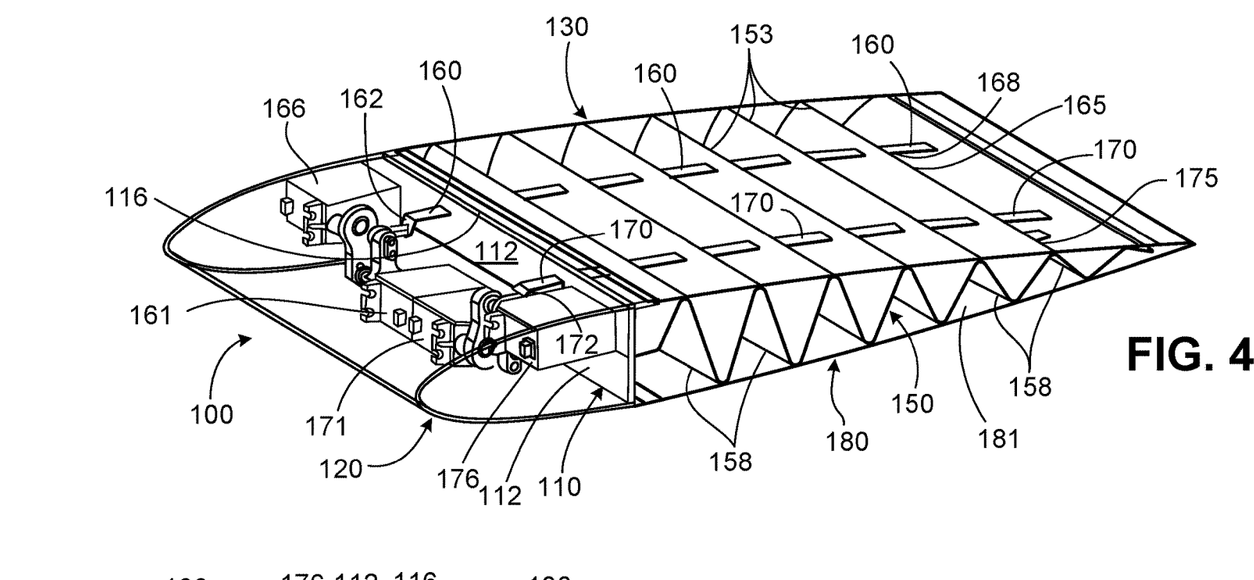
FIG. 4 is an upper perspective view of wing as shown in FIG. 2, with the outer airfoil skin materials rendered transparent so that inner structures are visible.
Figure 5:
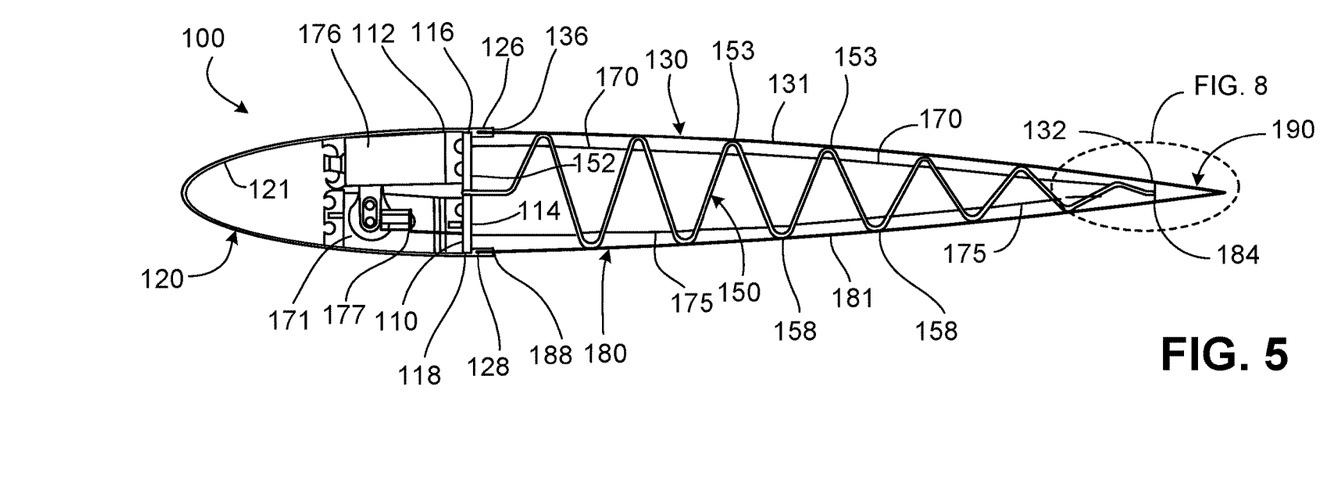
FIG. 5 is a side cross-sectional view of the wing taken along line 4-4 of FIG. 2 with the wing in a "neutral" position.

FIG. 1 shows a schematic view of an aircraft 10 that is using an airfoil member altering system 20. The airfoil member altering system 20 includes at least one motor or actuator system 30, a system controller 40, vehicle performance sensors 44, and a wing or an airfoil member 14 comprising at least one geometric morphing device 50 that is adjustable along three degrees of freedom. The airfoil member 14 can include one or more rigid members 60 for providing enhanced structural integrity. The system controller 40 can be operatively (e.g., electrically) coupled to the motor or actuator system 30, to the vehicle performance sensors 44, and one or more sensors 46 embedded in the morphing device 50 to detect a condition of the airfoil member 14. For example, sensors 46 can be load cells that monitor forces at various points of the airfoil member 14 and morphing device 50.

The system controller 40 determines airfoil shape for multiple flight conditions. The system controller 40 can be microprocessor-based, such as a computer having a central processing unit, memory (RAM and/or ROM), and associated input and output buses. The system controller 40 can be a portion of a central main control unit, a flight controller, an integrated controller, or can be stand-alone controllers as shown.

For simplicity, FIG. 1 shows a single geometric morphing device 50 for a single airfoil member 14; however, the apparatus, systems, and methods can use multiple airfoil members each of which can have multiple morphing devices 50. Although only one motor or actuator system 30 is shown, more than one motor or actuator system can be employed for one morphing device 50. Thus the airfoil member 14 can include "repeating units" of the morphing device 50, thereby providing an airfoil member 14 with an adjustable shape along its entire length from wing root to wing tip. Additionally, more than one motor or actuator system can be used to independently control each of the morphing devices 50 if multiple morphing devices 50 are present.

Although FIG. 1 shows the airfoil member altering system 20 as part of a cantilevered wing on the aircraft 10; the airfoil member 14 can have both ends fixed to a structure, such as in automotive spoiler applications.

FIGS. 2-5 show a portion of an exemplary wing 100 that is part of the airfoil member 14 shown in FIG. 1. The wing 100 includes a spar member 110, an airfoil skin 108, a corrugated wing skin support sheet 150 (or airfoil skin support sheet), a plurality of actuating bands 160, 165, 170, and 175 extending rearwardly from the spar member 110 to a trailing edge member 190, and a plurality of actuators 161, 166, 171, and 176 operably connected to the respective actuating bands 160, 165, 170, and 175. The airfoil skin 108 includes a forward wing skin 120, and rearward upper and lower wing skins 130 and 18 that together form an outer shell having a smooth continuous wing surface. The spar member 110, wing skin support sheet 150, actuating bands 160, 165, 170, and 175, and actuators 161, 166, 171, and 176 are enclosed within a wing cavity 102 formed within the shell, and together form the morphing device 50 shown in FIG. 1.

The spar member 110 extends in a lateral direction (as indicated by bidirectional arrow 99) within the wing 100 and includes opposed forward and rearward walls 112 and 114 contiguous with upper and lower edges 116 and 118. In the figures the spar member 110 is depicted as plate shaped. Other configurations for the spar member 110 can be suitable, including but not limited to a tubular shape, and I-shape, or a corrugated shape. The spar member can be formed in a unitary construction with the forward wing skin 120 and/or the rearward upper and lower wing skins 130 and 180.

Figure 6:
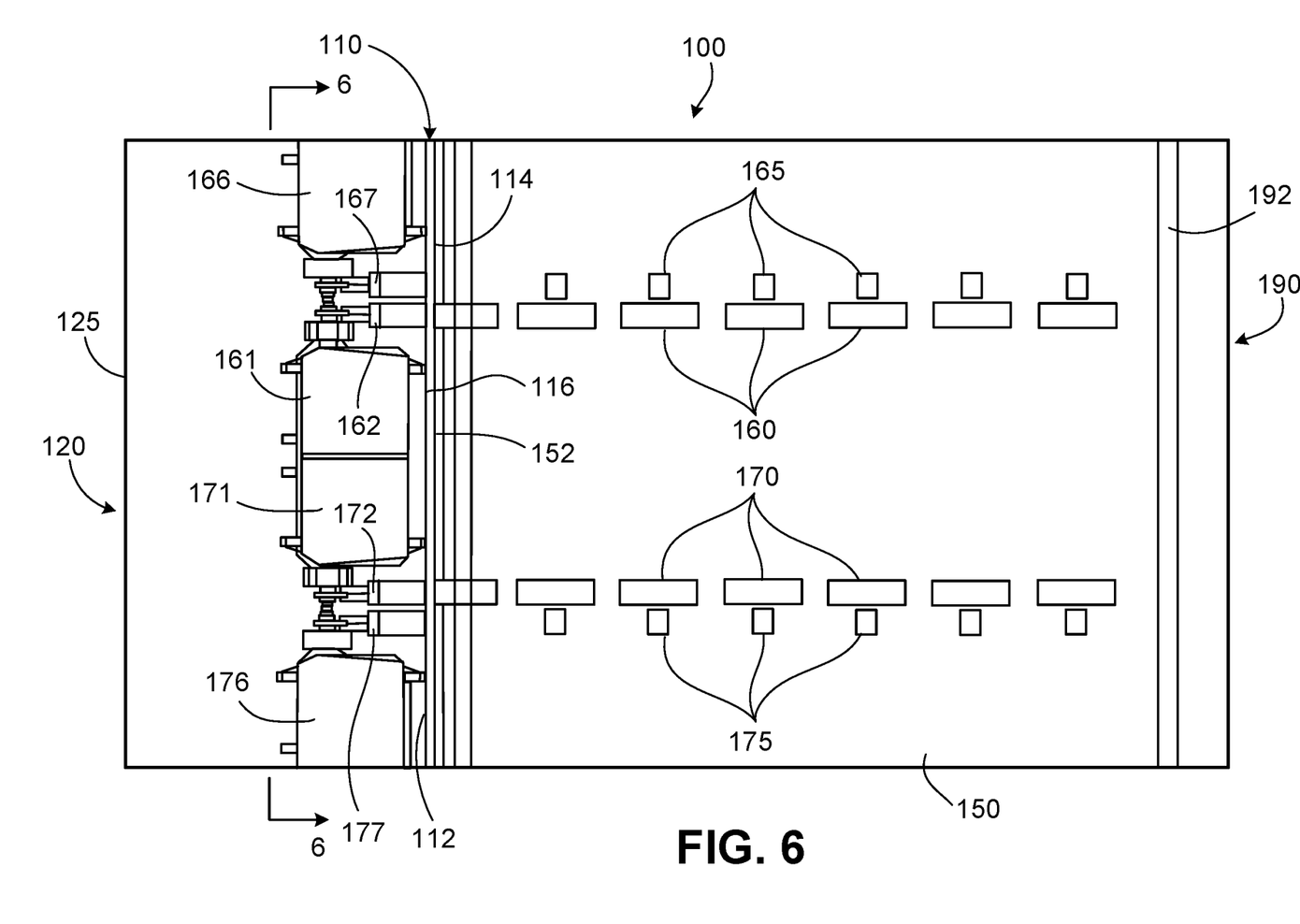
FIG. 6 is a top orthogonal view of wing of FIG. 2, with the outer airfoil skin materials of the wing rendered as transparent.
Figure 7:
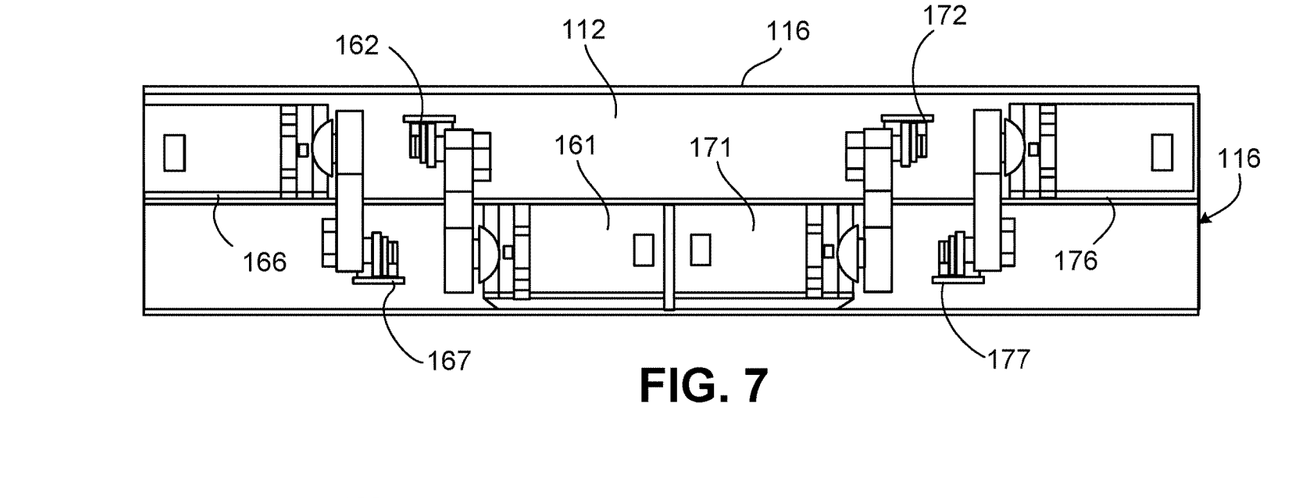
FIG. 7 is a front orthogonal view of wing of FIG. 2, with the forward wing skin removed, taken along line 6-6 of FIG. 6.
Figure 8:
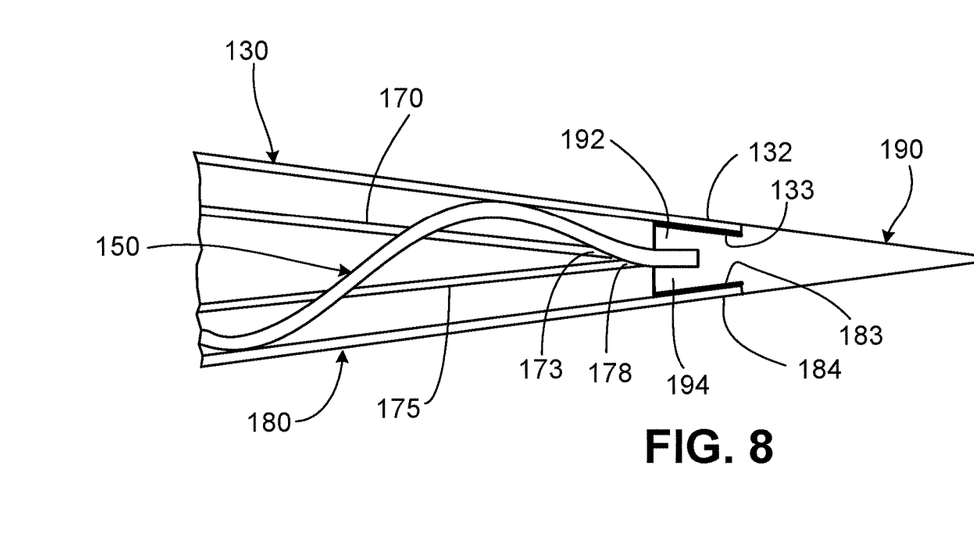
FIG. 8 is a detailed side cross-sectional view of the rearward end of the wing of FIG. 2.
Figure 9:
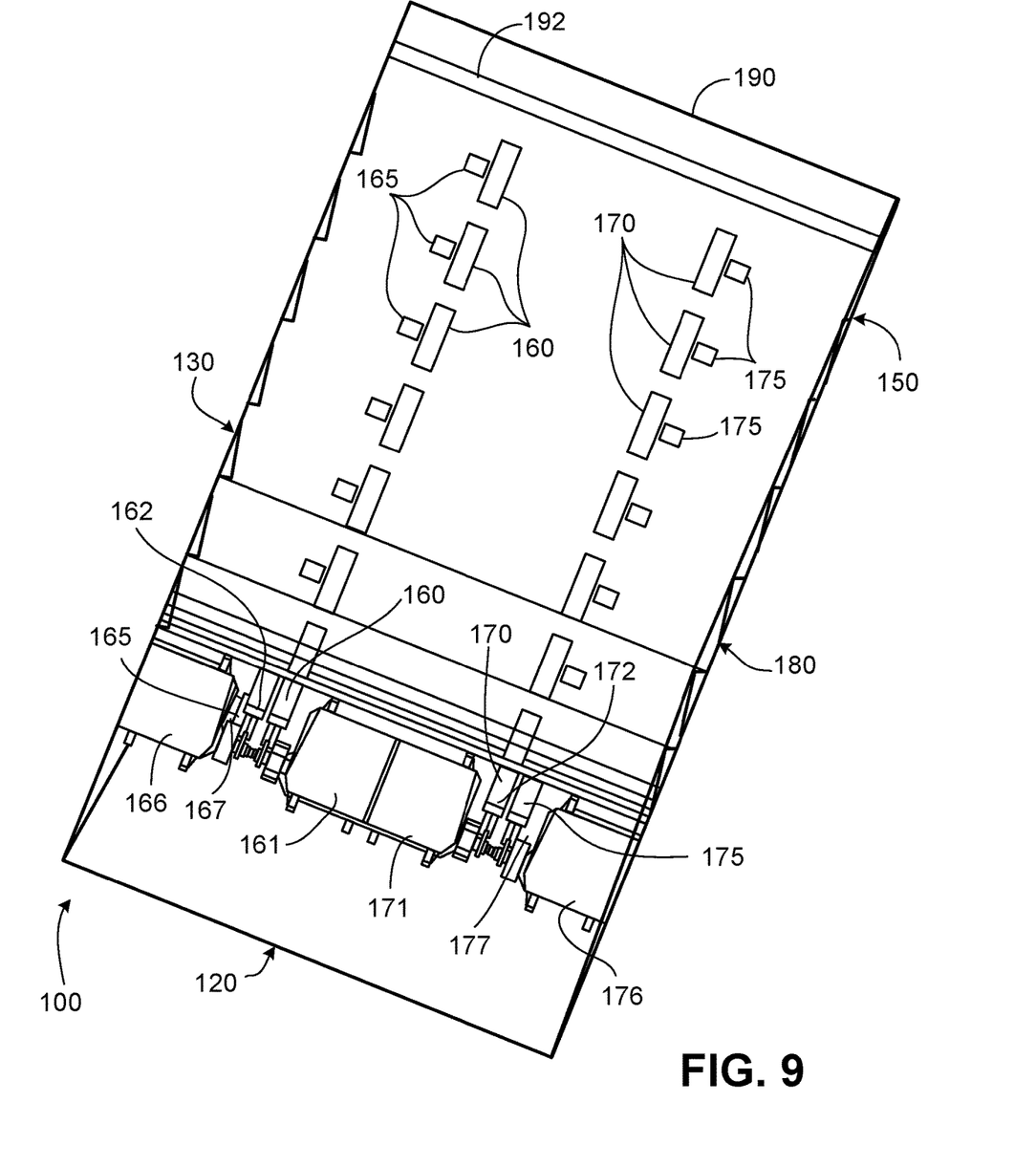
FIG. 9 is a top perspective view of wing of FIG. 2, with the outer surface material of the wing rendered as transparent.

The forward wing skin 120 includes an inner surface 121 and an upper rearward end 126 joined to the upper edge 116 of the spar member 110, and a lower rearward end 128 joined to the lower edge 118 of the spar member 110. The forward wing skin 120 extends forwardly from the upper rearward end 126 in an arcuate shape to a forward leading edge 125 (see FIG. 6), and rearwardly from the forward leading edge 125 in an arcuate shape to the lower rearward end 128. The rearward upper wing skin 130 includes an inner surface 131 and an upper forward end 136 joined to the upper rearward end 126 of the forward wing skin 120, and an upper rearward end 132 joined to a forward upper end 192 of a trailing edge member 190 extending in the lateral direction along the rearward most portion of the wing 100. (See also FIG. 8.) In like manner, the rearward lower wing skin 180 includes an inner surface 181 and a lower forward end 188 joined to the lower rearward end 128 of the forward wing skin 120, and a lower rearward end 184 joined to a forward lower end 194 of the trailing edge member 190.

The joining of the forward wing skin 120 to the spar member 110, and joining of the rearward upper wing skin 130 and the lower wing skin 180 to the forward wing skin 120 (and/or the spar member 110), and joining of the rearward upper wing skin 130 and the lower wing skin 180 to the trailing edge member 190 can be accomplished by suitable fasteners such as rivets (not shown), or by a suitable adhesive, or both. For example, referring to FIG. 8, the rearward upper wing skin 130 and the lower wing skin 180 are joined to the trailing edge member 190 by adhesive 133 and 183.

FIGS. 4-9 depict the wing 100 with the airfoil skin 108 transparent so as to show the structures beneath. A forward end 152 of the wing skin support sheet 150 is joined in the lateral direction to the rearward wall 114 of the spar member 110 by suitable adhesive, fasteners (not shown) or other means, and extends rearwardly. The wing skin support sheet 150 is corrugated to define alternating upper lines 153 and lower lines 158 of contact with the inner surfaces 131 and 181 of the respective rearward upper and lower wing skins 130 and 180. In that manner, the wing skin support sheet 150 maintains a separation of the rearward upper wing skin 130 from the rearward lower wing skin 180. The separation distance tapers rearwardly, from the distance between the upper and lower edges 116 and 118 of the spar member 110 to the distance between the forward upper end 192 of the trailing edge member 190 and the forward lower end 194 of the trailing edge member 190. In certain embodiments, the wing skin support sheet 150 can extend rearwardly from the spar member 110 to the trailing edge member 190 in an alternating upward and downward manner, approximately forming the shape of a damped sine wave.

The plurality of actuating bands includes a lower left actuating band 165, an upper left actuating band 160, a lower right actuating band 175, and an upper right actuating and 170. The lower left actuating band 165 extends rearwardly from the spar member 110 through alternating upward and downward sections of the wing skin support sheet 150 and is joined at a rearward end 168 thereof to one of the rearward ends 132 and 184 of the respective upper or lower wing skins 130 or 180, or to the trailing edge member 190. The upper left actuating band 160 extends rearwardly from the spar member 110 through the alternating upward and downward sections of the wing skin support sheet 150 and is joined at a rearward end thereof to one of the rearward ends 132 and 184 of the respective upper or lower wing skins 130 or 180, or to the trailing edge member 190. The lower right actuating band 175 extends rearwardly from the spar member 110 through the alternating upward and downward sections of the wing skin support sheet 150 and is joined at a rearward end 178 thereof to one of the rearward ends 132 and 184 of the respective upper or lower wing skins 130 or 180, or to the trailing edge member 90.

The upper right actuating band 170 extends rearwardly from the spar member 110 through the alternating upward and downward sections of the wing skin support sheet 150 and is joined at a rearward end 173 thereof to one of the rearward ends 132 and 184 of the respective upper or lower wing skins 130 or 180, or to the trailing edge member 190.

The plurality of actuators includes a lower left actuator 166, an upper left actuator 161, a lower right actuator 176, and an upper right actuator 171. The lower left actuator 166 is mounted on the spar member 110 and is connected to a forward end 167 of the lower left actuating band 165 and is operable to displace the lower left actuating band 165 forwardly and rearwardly. The upper left actuator 161 is mounted on the spar member 110 and is connected to a forward end 162 of the upper left actuating band 160 and is operable to displace the upper left actuating band 160 forwardly and rearwardly. The lower right actuator 176 is mounted on the spar member 110 and is connected a forward end 177 of the lower right actuating band 175 and is operable to displace the lower right actuating band 175 forwardly and rearwardly. The upper right actuator 171 is mounted on the spar member 110 and is connected a forward end 172 of the upper right actuating band 170 and is operable to displace the upper right actuating band 170 forwardly and rearwardly.

The actuators 161, 166, 171, and 176 can be electrical, pneumatic, human-driven, or hydraulic actuators. For example, the actuators are depicted as electrically operated rotary servos, each including a lever arm extending from a rotary shaft, with the distal end of the arm connected to a respective end of an actuating band.

Extension, upward and downward camber, and twist of the wing can all be varied independently of each other. The extension, camber, and twist capabilities are facilitated by the rearward upper and lower wing skins 130 and 180 and the wing skin support sheet 150 being flexible in upper and lower directions orthogonal to the lateral direction, and by the rearward upper and lower wing skins 130 and 180 being elastically deformable in upper and lower directions and forward and rearward directions orthogonal to the lateral direction. Extension can be changed between about 5% to about 10%.

Figure 10:
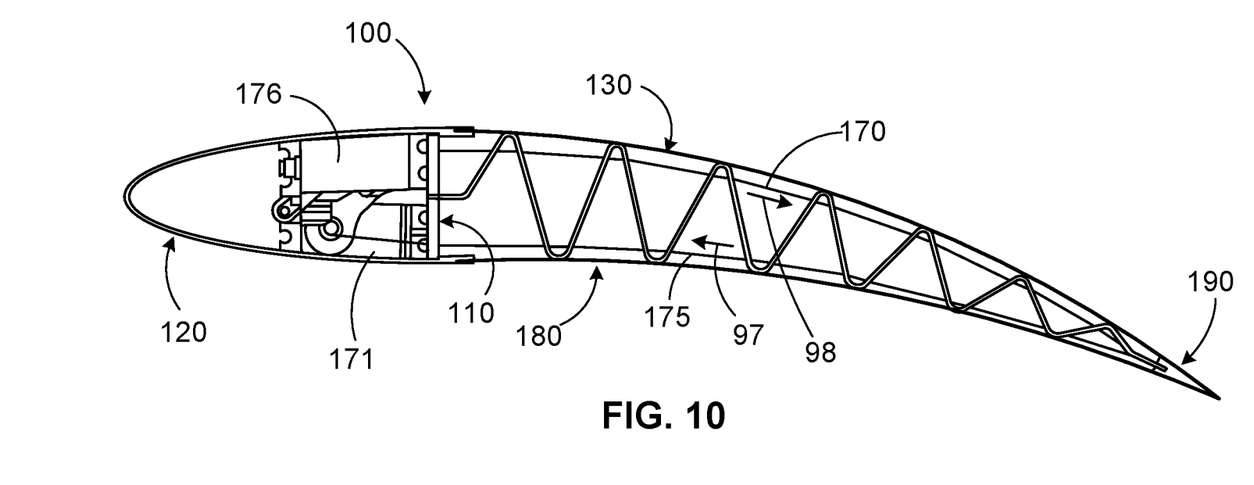
FIG. 10 is a side cross-sectional view of the wing maximally flexed in a downward camber position.
Figure 11:
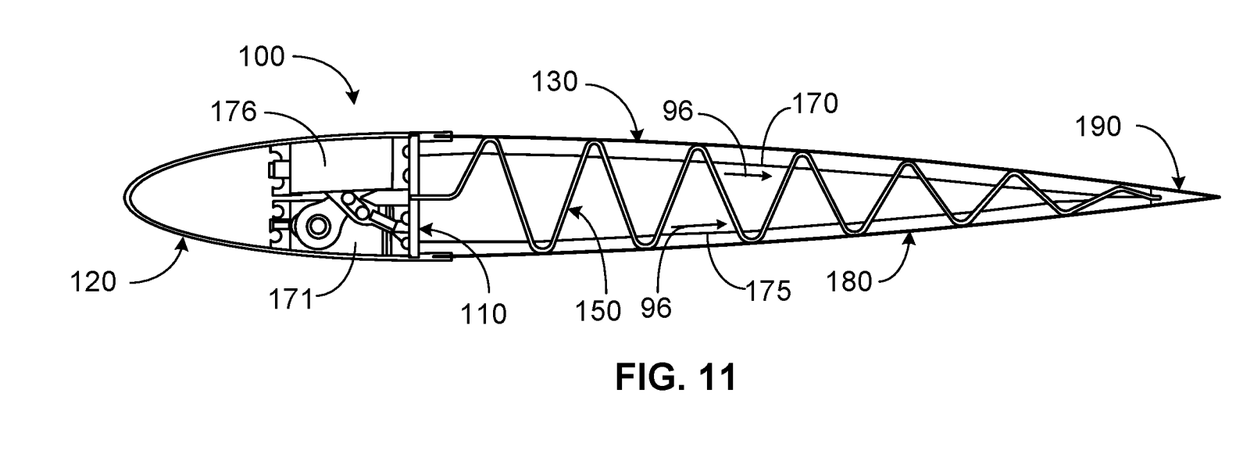
FIG. 11 is a side cross-sectional view of the wing as shown in FIG. 5, with the length of the wing is maximally extended.

Referring to FIG. 10, rearward actuation of the upper left and upper right actuating bands 160 and 170 as indicated by arrow 98, and forward actuation of the lower left and lower right actuating bands 165 and 175 as indicated by arrow 97, cambers the wing 100 downwardly. In like manner (but not shown), forward actuation of the upper left and upper right actuating bands 160 and 170 and rearward actuation of the lower left and lower right actuating bands 165 and 175 cambers the wing upwardly. Referring to FIG. 11, rearward actuation of the upper left, upper right, lower left, and lower right actuating bands 160, 170, 165, and 175 as indicated by arrows 96 extends the wing 100 rearwardly, thereby increasing the chord length.

Figure 12:
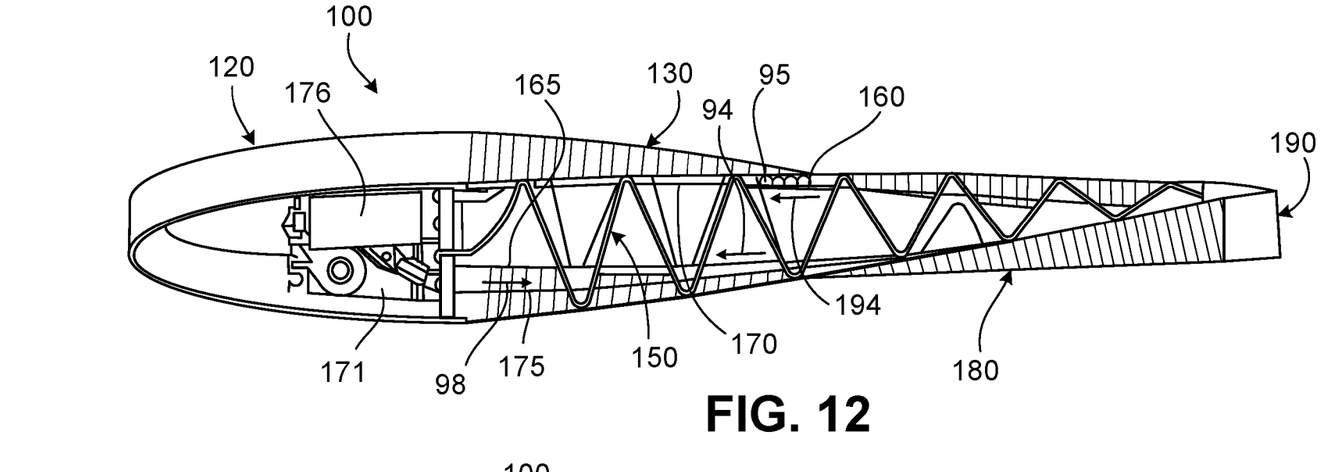
FIG. 12 is side cutaway view of the wing in a first twisted position.
Figure 13:
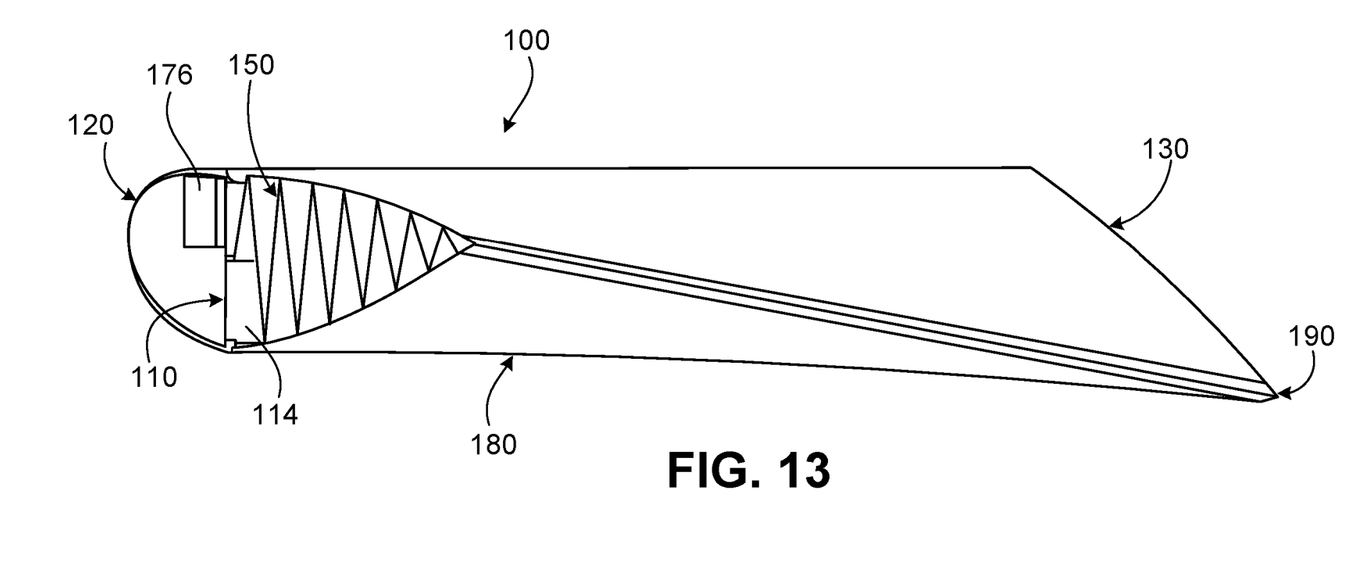
FIG. 13 is rearward perspective of the wing in the first twisted position.

Referring to FIGS. 12 and 13, rearward actuation of the upper left actuating band 160 and lower right actuating band 175 as indicated by arrows 95, and forward actuation of the lower left actuating band 165 and upper right actuating band 170 as indicated by arrows 94 twists the wing relative to the lateral axis (shown by arrow 99) in a first direction. In like manner (but not shown), forward actuation of the upper left actuating band 160 and lower right actuating band 175 and rearward actuation of the lower left actuating band 165 and upper right actuating band 170 twists the wing around the lateral axis in a second direction opposed to the first direction.

Figure 14A:
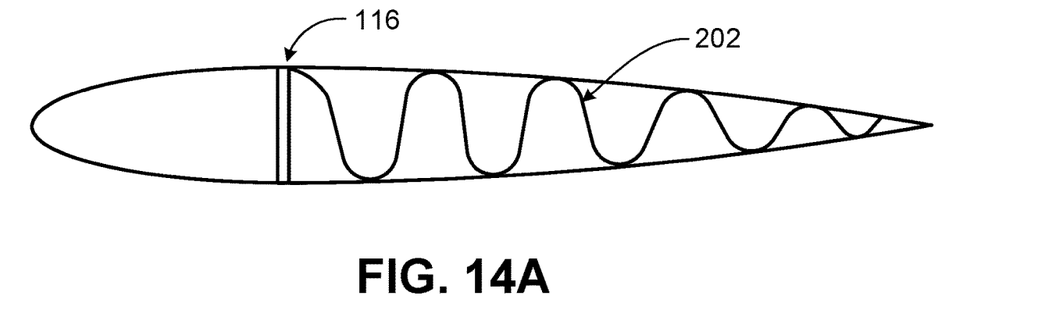
FIG. 14A is a side cross-sectional view of the wing with corrugated support extending from a top surface.
Figure 14B:
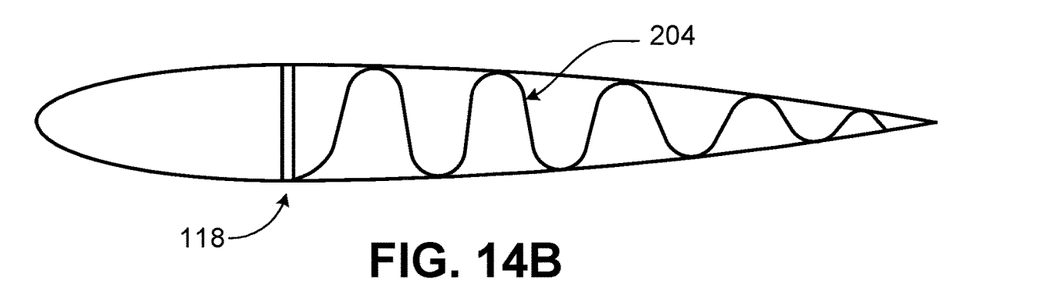
FIG. 14B is a side cross-sectional view of the wing with corrugated support extending from a bottom surface.

The wing skin support sheet 150 is a corrugated structure. This corrugation can extend over the chord length as well as in the twist direction. FIGS. 2-13 show a corrugated structure in the shape of a damped sine wave that extends from a centerline of the spar member 110 and rearwardly along the chord of the wing 100. Other configurations are also possible. For example, FIG. 14A shows the wing skin support sheet 202 attached to the upper edge 116 of the spar member 110 in a shifted damped sine (e.g., a cosine) wave. Alternatively, the wing skin support sheet 204 can be attached to the lower edge 118 of the spar member 110, FIG. 14B. Such arrangements enhance the overall strength of the wing 100.

Figure 15A:
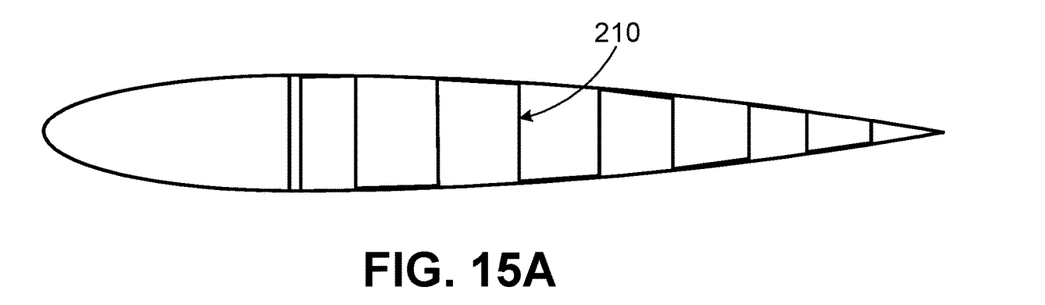
FIG. 15A is a side cross-sectional view of the wing with corrugated support as a square wave.
Figure 15B:
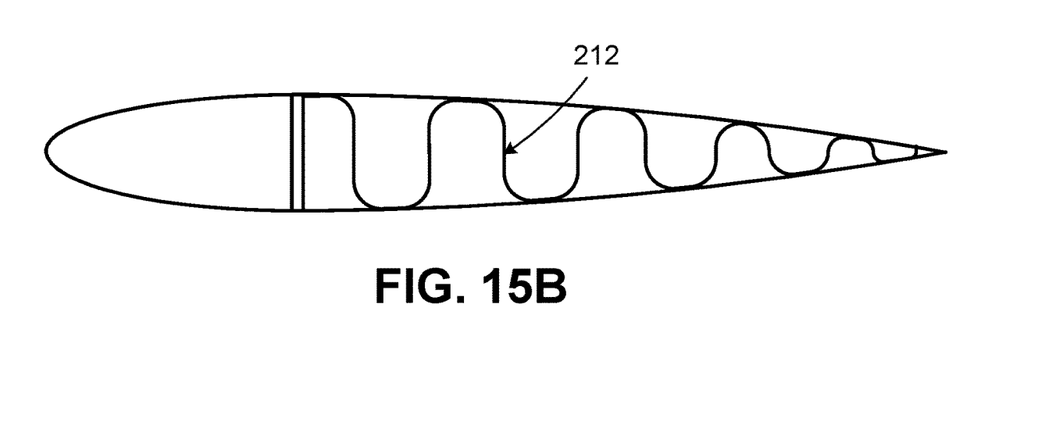
FIG. 15B is a side cross-sectional view of the wing with corrugated support as a partially curved square wave.

While the figures have shown wing skin support sheet 150 as a damped square wave, other shapes are also possible. For example, FIG. 15A shows a wing skin support sheet 210 that has the shape of a damped square wave. FIG. 15B shows a wing skin support sheet 212 that has the shape of a damped square wave that has curved edges near the lines of contact with the inner surfaces of the rearward upper skin 130 and rearward lower skin 180.

The wing skin support sheet 150 can be any material known in the art whose elastic deformability can be altered by a controllable stimulus. The wing skin support sheet 150 (or 210 or 212) can be formed of Kevlar, carbon fibers, aluminum fibers, or other fibers known in the art with high tensile strength. The wing skin support sheet 150 can be made of other structurally strong but lightweight materials that provide rigidity to the wing 100. In some embodiments, the wing skin support sheet 150 can be fabricated from a sheet of unidirectional and woven carbon fiber having a thickness of approximately 0.5 mm.

The wing skin support sheet 150 can be a composite structure. For example, the wing skin support sheet 150 can include three layers, made of differing, or the same materials but with differing organization of the material. The top and bottom layers can have a unidirectional fiber configuration (e.g., spanning from the leading edge 125 to the trailing edge member 190) while the center layer can have a bilateral weave structure.

The wing skin support sheet 150 can also have varying tensile strength at different portions. For example, using a composite construction, fiber mesh can be embedded within a matrix material that forms the majority of the wing skin support sheet 150, overlaid above or underneath the matrix material, or enclose the matrix material. The wing skin support sheet 150 can have a uniform, patterned, diverse, or varying fiber angle distribution. The density of the fibers or the number of fibers per square inch area of the wing skin support sheet 150 can be diverse depending on the location of the morphing device on the aircraft. Locations of increased stress and strain can be fabricated with a different material, for example, the regions of high curvature at the tops and bottoms of the sinusoidal wing skin support sheet 150 that meet the airfoil skin 108 (the lines of contact 153 and 158) can be a different (e.g., stronger) material than the rest of the wing skin support sheet 150.

In some instances, the leading edge 125 and the wing skin support sheet 150 can be monolithic. In other instances, the leading edge 125 and the wing skin support sheet 150 can be different parts, and the wing skin support sheet 150 configured to fit within an existing standard leading edge design, e.g., retrofit existing wings.

The trailing edge member 190 can be made of 3D printed plastics, light metals, or carbon fiber. The rearward upper and lower wing skins 130 and 180 can be made of a sheet of silicone rubber having a thickness of about 0.5 mm. Other sheet elastomeric materials are also possible.

The silicone sheet 130 and 180 are attached, in order from the respective forward edges to the rearward edges, to notches in the rearward edges of the carbon fiber forward wing skin 120, the maxima/minima (lines of contact 153 and 158) of the corrugated wing skin support sheet 150, and to notches in the trailing edge member 190.

The maximum deflection as well as spanwise strength, can be increased by fabricating the rearward upper and lower wing skins 130 and 180 from an elastomer with a unidirectional carbon fiber core. The skin flexibility is the limiting factor for deflection.

In some embodiments, the forward wing skin 120 is constructed from a carbon fiber composite material. The forward wing skin 120 is static, e.g., of constant shape when the wing is in use. The forward wing skin 120 is attached to the spar member 110, which is constructed from carbon fiber with an aramid honeycomb core extending laterally.

Four linkages are connected to servos and to the ends of the actuating bands used to vary the shape of the wing 100. The servos are attached to the forward wall of the spar member 110. Due to the limited vertical space in the leading edge (which may not be an issue for larger scale wings), the servos are offset on the spar member 110; two servos are attached to a top region and two servos are attached to a bottom region of the spar member 110. The four servos actuate four respective carbon fiber linkages, which are connected to the respective actuating bands 160, 165, 170, and 175, also made of carbon fiber composite, which extended through slots in the spar member 110 and rearwardly through slots in the corrugated wing skin support sheet 150. The actuating bands 160, 165, 170, and 175 are attached to the furthest downstream portion of the corrugated wing skin support sheet 150. In some embodiments, additional actuators or servos can be attached to the actuating bands 160, 165, 170, and 175 at positions between the spar member 110 and the trailing edge member 190. The actuating bands 160, 165, 170, and 175 can also be reinforced with stronger material, or increased or decreased in size, depending on the application.

By operation of the servos (actuators) as previously described herein, the shape of the wing is variable with respect to camber, extension (chord), and twist as described herein. Wing twist requires significantly less range of servo motion than camber and chord. Embodiments of wings made in accordance with the present disclosure can use other actuator systems, such as linear actuators or centrally located actuators connected to the linkages by pulleys, to increase range of motion. In an alternative embodiment, more than four actuators can be used, thus enabling a non-linear shape progression along the wing. This configuration can be especially useful for helicopter and wind turbines blades.

The variable shaped wing of the present disclosure can be used in a range of applications as previously described. For higher speed applications, e.g., for supersonic and transonic speeds, rigid upper and lower rearward skins 130 and 180 (such as from sheet metal) can be configured to slide in and out of a slot in the forward wing skin 120 of the wing 100. A corrugated skin support sheet structure can also be used for support and shape variation of the forward wing skin 120 in addition to or instead of the upper and lower rearward skins 130 and 180. Such a configuration can also be used to counteract unstable airflow conditions by oscillating the camber of the wing at a specific frequency.

The wing 100 can be controlled by automated feedback. Such control can be accomplished by the system controller 40. The controller can be contained within the wing, or be a remote processor in wireless communication with the actuators and with sensors in the wing. Such sensors include, but are not limited to pressure sensors and/or velocity sensors embedded in the wing skin, and strain gauges at various locations on interior surfaces of the upper and lower rearward skins 130 and 180, the spar member 110, and/or the corrugated wing skin support sheet 150. The vehicle performance sensors 44 can include vehicle external air pressure sensors, velocity sensors, acceleration sensors, moment sensors, altitude sensors, or other sensors known in the art. The vehicle performance sensors 44 can determine a current velocity and acceleration of the aircraft 10, as well as determining a current moment about a yaw heading or z-axis, a pitch or x-axis, and roll or y-axis. A feedback control loop can use data from sensors mounted at different points on the wing to continually optimize the shape of the wing under changing external conditions. Alternatively, a more simple control system for an aircraft application can include measuring the airspeed, air density, and angle of attack (these data are already collected on most aircraft), and changing the wing's shape to a predetermined optimal shape for the particular flight conditions.

A number of embodiments of the invention have been described. Nevertheless, it will be understood that various modifications can be made without departing from the spirit and scope of the invention. For example, linkages connected to servos and to the ends of actuating bands are described for varying the shape of the wing 100. However, fly by wire could also be used to activate the bands, as could linear actuators, or piezoelectric elements. In the case of piezoelectric elements, such elements can be implanted in the carbon fiber of the wing skin support sheet 150. Accordingly, other embodiments are within the scope of the following claims.

What is claimed is:

1. An airfoil member comprising:
an airfoil skin having a forward skin, a rearward upper skin, and a rearward lower skin;
a trailing edge member;
a spar member extending in a lateral direction within the airfoil skin; and
an airfoil member morphing device configured to modify a shape of the airfoil skin, the device comprising:
at least one motor or actuator,
an airfoil skin support sheet attached to the spar member and extending to the trailing edge member, the airfoil skin support sheet corrugated to define alternating upper and lower lines of contact with inner surfaces of the rearward upper skin and rearward lower skin, and
a plurality of actuating bands extending from the spar member through alternating upward and downward sections of the airfoil skin support sheet and joined at a rearward end thereof to a rearward end of the rearward upper skin and rearward lower skin or to the trailing edge member, the plurality of actuating bands operably connected to the at least one motor or actuator,
wherein the airfoil member morphing device is configured to independently adjust a camber, twist, and chord length of the airfoil member by actuation of the at least one motor or actuator on the plurality of actuating bands.

2. The airfoil member of claim 1, wherein the airfoil skin support sheet extends from the spar member in the shape of a damped sine wave.

3. The airfoil member of claim 1, wherein the airfoil skin support sheet extends from the spar member in the shape a damped square wave.

4. The airfoil member of claim 3, wherein the damped square wave has curved edges near the lines of contact with the inner surfaces of the rearward upper skin and rearward lower skin.

5. The airfoil member of claim 1, wherein the airfoil skin support sheet is attached to a center of the spar member.

6. The airfoil member of claim 1, wherein the airfoil skin support sheet is attached near a top or bottom edge of the spar member.

7. The airfoil member of claim 1, wherein the at least one motor or actuator is attached to the spar member.

8. The airfoil member of claim 1, wherein the at least one motor or actuator is attached to at least one of the plurality of actuating bands at a position between the spar member and the trailing edge member.

9. The airfoil member of claim 1, wherein the plurality of actuating bands comprise upper left, upper right, lower left, and lower right actuating bands.

10. The airfoil member of claim 9, wherein rearward actuation of the upper left and upper right actuating bands and forward actuation of the lower left and lower right actuating bands cambers the airfoil member downwardly, and forward actuation of the upper left and upper right actuating bands and rearward actuation of the lower left and lower right actuating bands cambers the airfoil member upwardly.

11. The airfoil member of claim 9, wherein rearward actuation of the upper left, upper right, lower left, and lower right actuating bands increases the chord length of the airfoil member.

12. The airfoil member of claim 11, wherein rearward actuation of the upper left, upper right, lower left, and lower right actuating bands increases the chord length by at least approximately 5 degrees.

13. The airfoil member of claim 9, wherein rearward actuation of the upper left and lower right actuating bands and forward actuation of the lower left and upper right actuating bands twists the airfoil member around a lateral axis in a first direction, and forward actuation of the upper left and lower right actuating bands and rearward actuation of the lower left and upper right actuating bands twists the airfoil member around the lateral axis in a second direction opposite to the first direction.

14. The airfoil member of claim 1, wherein the rearward upper skin and rearward lower skin are flexible in upper and lower directions orthogonal to the lateral direction and elastically deformable in upper and lower directions and forward and rearward directions orthogonal to the lateral direction.

15. The airfoil member of claim 1, wherein the airfoil skin support sheet is flexible in upper and lower directions orthogonal to the lateral direction.

16. The airfoil member of claim 1, wherein the forward skin and airfoil skin support sheet are monolithic.

17. The airfoil member of claim 1, wherein the airfoil skin support sheet comprises a first material, and a second material near the lines of contact with the inner surfaces of the rearward upper skin and rearward lower skin.

18. The airfoil member of claim 1, wherein the at least one motor or actuator is electrically coupled to a system controller.

19. The airfoil member of claim 1, comprising sensors within the airfoil skin, the sensors configured to detect a condition of the airfoil member.

20. An airfoil system comprising:
a wing spanning in a lateral direction from a wingtip to a wing root;
a plurality of airfoil members joined sequentially along the lateral direction, each airfoil member comprising:
an airfoil skin having a forward skin, a rearward upper skin, and a rearward lower skin;
a trailing edge member;
a spar member extending in a lateral direction within the airfoil skin; and
an airfoil member morphing device configured to modify a shape of the airfoil skin, the device comprising:
at least one motor or actuator,
an airfoil skin support sheet attached to the spar member and extending to the trailing edge member, the airfoil skin support sheet corrugated to define alternating upper and lower lines of contact with inner surfaces of the rearward upper skin and rearward lower skin, and a plurality of actuating bands extending from the spar member through alternating upward and downward sections of the airfoil skin support sheet and joined at a rearward end thereof to a rearward end of the rearward upper skin and rearward lower skin or to the trailing edge member, the plurality of actuating hands operably connected to the at least one motor or actuator, wherein the airfoil member morphing device is configured to independently adjust a camber, twist, and chord length of the airfoil member by actuation of the at least one motor or actuator on the plurality of actuating bands, and a system controller operatively connected to the airfoil members, and configured to send commands to the airfoil members to independently adjust a camber, twist, and chord length of least a portion of the wing.

* * * * *

UNITED STATES PATENT AND TRADEMARK OFFICE
CERTIFICATE OF CORRECTION

| | |
|---|---|
| PATENT NO. | : 11,203,409 B2 |
| APPLICATION NO. | : 16/277304 |
| DATED | : December 21, 2021 |
| INVENTOR(S) | : Fenske |

It is certified that error appears in the above-identified patent and that said Letters Patent is hereby corrected as shown below:

In the Claims

Column 11, Line 51, Claim 3, please delete "shape a" and insert therefor -- shape of a --;

Column 13, Line 9, Claim 20, please delete "hands" and insert therefor -- bands --.

Signed and Sealed this
Nineteenth Day of April, 2022

Katherine Kelly Vidal
*Director of the United States Patent and Trademark Office*